UNITED STATES PATENT OFFICE.

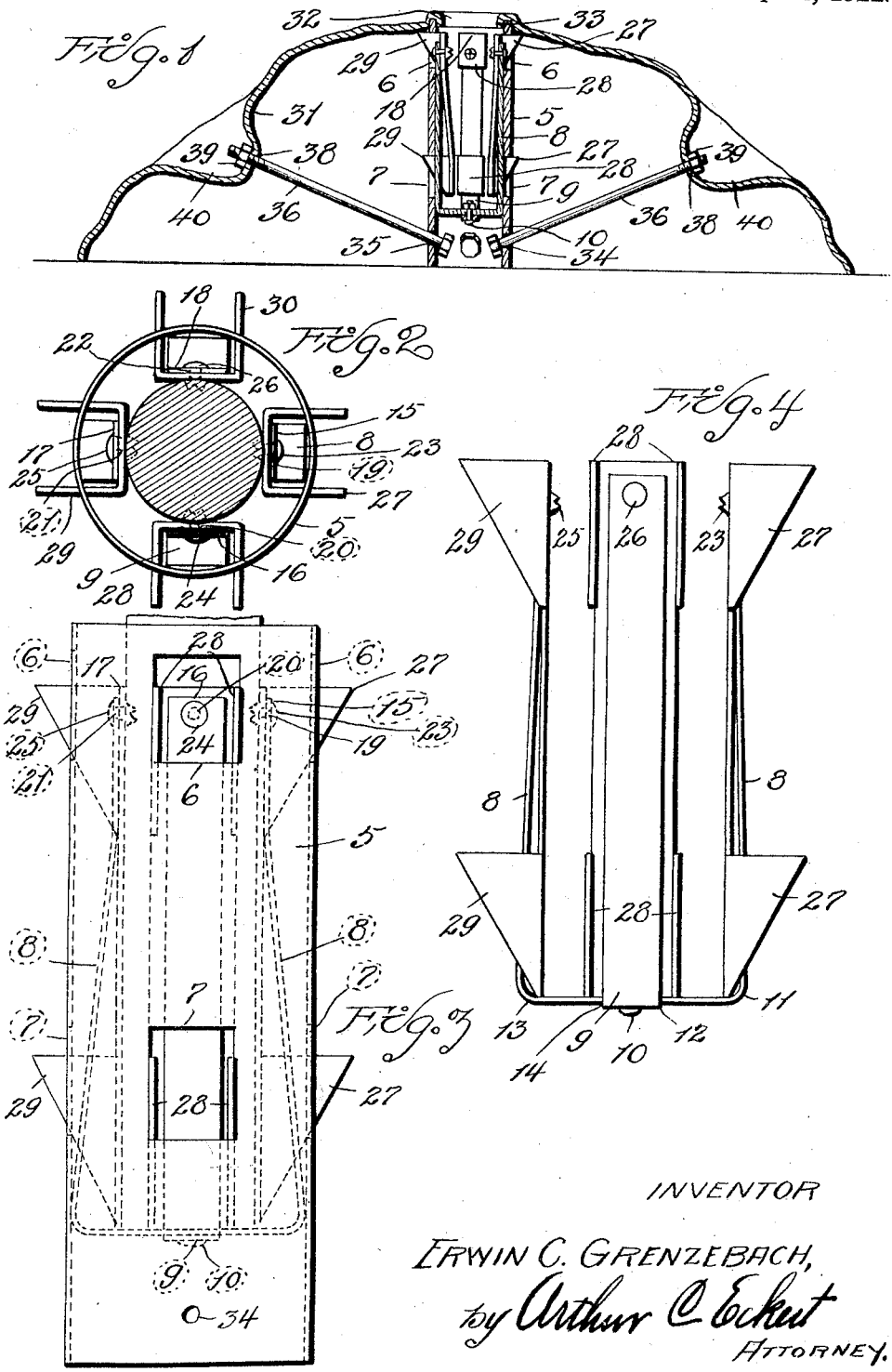

ERWIN C. GRENZEBACH, OF ST. LOUIS, MISSOURI.

TREE STAND.

1,411,722.  Specification of Letters Patent.  Patented Apr. 4, 1922.

Application filed January 9, 1922. Serial No. 528,079.

*To all whom it may concern:*

Be it known that ERWIN C. GRENZEBACH, a citizen of the United States of America, residing at 3122 Magnolia Avenue, in the city of St. Louis and State of Missouri, has invented certain new and useful Improvements in Tree Stands, of which the following is a specification.

The object of my invention is to fabricate a tree stand particularly for use with Christmas trees. A further object is to so construct a tree stand that a tree may be secured rigid therein, one in which a tree may be positioned by simply extending the butt of the tree therein, one that will automatically seat the tree in the stand in a firm position when the tree butt is pressed into the stand, one that can be used for trees of different diameters without any adjustment or mechanical operation, one that will permit the movement of the stand by adjustment so that the trunk of the tree will be held vertical even if the butt of the tree is formed at an angle to the trunk, and one in which the entire stand will be concealed by a covering simulating the appearance of a natural object such as a rock. A further object is to so construct a stand that it will be simple in construction, made of standard parts and material and one that will lend itself readily to multiple production. A still further object is to produce a stand that is absolutely rigid and practically indestructible.

With these and other objects in view, my invention has relation to certain novel features of construction and arrangements of parts as will be hereinafter more fully described, pointed out in the claims and illustrated in the drawings, in which—

Fig. 1 is a longitudinal sectional elevation of my entire stand,

Fig. 2 is a plan view of the clamping element of my device, and

Fig. 3 is a front elevation of my clamping element, and

Fig. 4 is a front elevation of the movable element in my clamping element with the remainder of the clamping element removed.

Numeral 5 designates a hollow cylinder preferably made of sheet metal construction and of a diameter equal to the largest size of tree that is to be accommodated by the stand. In the lateral surface of the cylinder 5 are formed rectangular slots 6 of which there are four in the same lateral plane. In the cylinder 5, below the slots 6, are formed the slots 7 of which there are four and which are similarly positioned in the same lateral plane. The distance between the bottom of the slots 6 and the top of the slots 7 is made of a convenient length. The movable clamping element is formed of two metal strips 8 and 9 which are rotatively secured together by the bolt 10 and bent at right angles at the points 11, 12, 13 and 14 as best shown in Fig. 4. The ends of the strips 8 terminate at the points 15, 16, 17 and 18 respectively and have the holes 19, 20, 21 and 22 formed therein as best shown in Fig. 4.

At the ends of the strips 18 by means of rivets 23, 24, 25 and 26, the spring elements 27, 28, 29 and 30 are rigidly secured. At the secured end of the spring elements 27 to 30, both inclusive, are formed the U shaped inclined planed projections and at the opposite free ends of the spring elements 27 to 30, both inclusive, are formed the similar U shaped inclined planed projections. The spring elements 27 to 30, both inclusive, are so positioned relative the ends of the strips 8 that the loose ends extend radially inwardly from the strips 8.

The dimensions of the strips 8 are such and the U shaped inclined planed projections are such that when the movable elements are positioned in the clamping element the U shaped inclined planed projections will protrude through the rectangular slots 6.

It will be seen that when the movable element is positioned in the clamping element as best shown in Fig. 3 that the stand is ready to receive the tree butt of the tree which it is to support. The internal ends of the rivets 23, 24, 25, and 26 are pointed as best shown in Fig. 4. When the butt of a tree is inserted in the clamping element on the inside of the movable element and pressed downwardly, it will be seen that the U shaped inclined planed projections will be forced inwardly against the spring action of the strips 8 and of the spring elements 27 to 30, both inclusive. The spring element will be forced radially inwardly to a distance equal to twice the length of the parallel faces of the U shaped inclined planed projections. This distance represents, therefore, the variations in size of tree butts that may be accommodated by the stand. When it is desirous of removing the tree, a simple jerk upward will release it.

Having now explained the method of securing the clamping element selectively to the butt of a tree, I will now disclose my method of securing the clamping element to a further supporting or non-tilting element which also functions as an ornament. Numeral 31 designates a sheet of metal having a hole punched in its center and pressed into the irregular conformation of a rock. The clamping element is positioned through the hole 32 as best shown in Fig. 1. The circumference of the hole 32 has a flange 33 formed thereon which is bent over the top end of the cylinder 5 thereby securing the metal sheet 31 to the clamping element. Near the base of the clamping element are formed holes such as shown at 34 and 35 in Fig. 1. I preferably use four such holes and have them staggered relative the rectangular slots 6. Numeral 36 designate rods, the ends of which are positioned through the holes 34 and 35 and secured therein in some conventional manner such as by nuts 37. The external ends of the rods 36 project through the holes 38 in the stand 31. In threaded engagement with their external ends are nuts such as 39. These bolts are projected through the crevices such as 40 in order to have the bolts 38 externally accessible with a minimum length of rod 36. These rods perform the dual function of increasing the relative rigidity between the stand and the clamping element and at the same time present means for adjusting the clamping element relative the stand by manipulating opposite nuts such as 38. It will be seen that by unscrewing one such nut 38 and screwing an opposite nut such as 38 in an opposite direction that the clamping element will be moved eccentrically relative the stand. This adjustment is highly advantageous where the butt of the tree is formed at an angle with the trunk. It is desirous of course, to have the trunk in a vertical position, it being immaterial whether the butt is vertical or not. The stand 31 may be covered with an ornamenting material such as artificial snow, etc.

What I claim and mean to secure by Letters Patent is—

1. In combination with a cylinder having slots therein, a movable element positioned in said cylinder and having U shaped inclined planed projections selectively engageable in the slots in said cylinder, a stand, said cylinder positioned in said stand and means of adjusting said cylinder relative said stand.

2. In combination with a cylinder having slots therein, a movable element positioned in said cylinder and having U shaped inclined planed projections selectively engageable in the slots in said cylinder, a stand entirely enveloping said cylinder, rods, extending from said cylinder to said stand and means of adjusting said cylinder relative said stand by means of said rods.

3. In combination with a cylinder having slots therein, a movable element positioned in said cylinder and having U shaped inclined planed projections selectively engageable in the slots in said cylinder, a stand enveloping said cylinder said stand made in the conformation of a rock, said cylinder positioned in said stand, rods projecting through the lateral surface of said cylinder and through perforations in said stand so that by varying the lengths of said rods the position of said cylinder relative said stand may be varied.

In testimony whereof I affix my signature.

ERWIN C. GRENZEBACH.